United States Patent [19]

Raes et al.

[11] Patent Number: 4,497,913

[45] Date of Patent: Feb. 5, 1985

[54] PROCESS FOR PREPARING A STABLE DISPERSION OF A POLYMER IN A POLYOL AND ITS USE IN THE PRODUCTION OF HIGH RESILIENCE POLYURETHANE FOAM

[75] Inventors: Maurice C. Raes, Branford; James M. O'Connor, Clinton; Michael L. Rosin, Madison, all of Conn.

[73] Assignee: Olin Corporation, New Haven, Conn.

[21] Appl. No.: 499,651

[22] Filed: May 31, 1983

[51] Int. Cl.$^3$ .................. C08G 18/65; C08G 18/66; C08K 5/05; C08K 5/06

[52] U.S. Cl. .................. 521/137; 521/904; 524/757; 524/761; 524/762; 524/765; 524/766; 524/769; 524/875; 525/458

[58] Field of Search ........... 524/875, 762, 757, 765, 524/769, 766, 761; 521/137, 904; 525/458

[56] References Cited

U.S. PATENT DOCUMENTS

| | | | |
|---|---|---|---|
| 3,325,421 | 6/1967 | Muller | 252/308 |
| 3,360,495 | 12/1967 | Muller | 524/761 |
| 4,089,835 | 5/1978 | Konig | 521/137 |
| 4,093,569 | 6/1978 | Reischl | 524/875 |
| 4,254,069 | 3/1981 | Dominguez | 521/904 |
| 4,293,470 | 10/1981 | Cuscurida | 528/49 |
| 4,296,213 | 10/1981 | Cuscurida | 521/137 |
| 4,298,511 | 11/1981 | Schimmel | 524/507 |
| 4,324,716 | 4/1982 | Reischl | 521/164 |
| 4,337,184 | 6/1982 | Schimmel | 524/875 |
| 4,374,209 | 2/1983 | Rowlands | 524/762 |
| 4,407,983 | 10/1983 | Gerkin | 521/137 |

*Primary Examiner*—C. Warren Ivy
*Attorney, Agent, or Firm*—William D. Sabo

[57] ABSTRACT

A stable dispersion of a polymer in a polyol is prepared by reacting an organic polyisocyanate with a short-chain polyol in a high molecular weight polyol containing a relatively high primary hydroxyl group content, the ratio of the content of primary hydroxyl groups in the short-chain polyol to that in the high molecular weight polyol being at least a critical lower limit of about 3.5. The reaction is further carried out in the presence of a small proportion of water to achieve a reduction in the viscosity of the resulting dispersion. The dispersion is used in preparing high resilience polyurethane foam having desirable physical properties and which is of utility in a wide variety of cushioning applications.

26 Claims, No Drawings

PROCESS FOR PREPARING A STABLE DISPERSION OF A POLYMER IN A POLYOL AND ITS USE IN THE PRODUCTION OF HIGH RESILIENCE POLYURETHANE FOAM

This invention relates to a stable dispersion of a polymer in a polyol; and, more particularly, to a relatively low viscosity dispersion of a polymer in a polyol containing a relatively high primary hydroxyl group content. The invention further relates to the use of the resulting stable dispersion in the preparation of high resilience polyurethane foam.

In the art of making flexible polyurethane foam, it is known that by utilizing foam-forming formulations incorporating a highly reactive organic polyisocyanate and a high molecular weight polyol having a certain level of primary hydroxyl group content, a foam with improved resilience and other desirable physical properties can be accomplished. Such resulting foams have come to be referred to in the art as "high resilience" foams. Resilience is defined as the ability to return readily to original shape and dimensions after a deforming force has been applied and removed from a body. In polyurethane foam technology, the industry generally considers "Sag factor" to be the characteristic which differentiates high resilience foams from conventional foams. This Sag factor is a measure of support provided by a cushioning material and it represents the ratio of indent load deflection, ILD, at 65 percent deflection to that at 25 percent deflection (as per ASTM D-1564-64T). According to SPI standards, conventional, flexible foams exhibit a Sag factor of about 1.7 to 2.2, while high resilience foams display a factor of above about 2.2 to about 3.2.

High resilience foams have found widespread application as cushioning material in furniture and bedding. Most significantly, these foams have been utilized in the automotive industry for making molded auto seats. The acceptance of these relatively new foams can be attributed to the fact that most already established polyurethane foam techniques can be readily applied to high resilience foams. However, foam stabilization and collapsing, one particular area of technology, has been found to be markedly non-transferable. Due to the highly reactive nature of the reaction mixture from which the high resilience foams are prepared, such foams have been found to exhibit characteristic pre-cure shrinkage. Conventional foam reaction mixture components which serve to stabilize the composition as it reacts, foams, and solidifies, are ineffective to prevent shrinkage or collapse in high resilience foaming reactions. Moreover, conventional stabilizers actually tend to cause severe voids, splits and shrinkage of the foam product.

To meet the stabilization requirements of high resilience foams, there have been developed various approaches in which so called "cell-openers" are incorporated in the foam. These added ingredients generally take the form of particles having diameters of about 2 micrometers or smaller. One technique involves the formation of "polymer-polyol" systems, which are produced from ethylenically unsaturated monomers and polyols, as exemplified by the disclosures in U.S. Pat. Nos. 3,383,351; 3,652,639 and 3,823,201. These polymer-polyols commonly are mixed with conventional polyether polyols and used as the starting polyol reactant.

Another reference, U.S. Pat. No. 4,108,791, discloses that high resilience polyurethane foams with improved foam properties can be accomplished by preparing the foam from polyols containing an inorganic filler, having an adjusted pH value of 6–8.5.

Another U.S. Pat. No. 4,278,770, teaches that polyol compositions containing effectively dispersed particulate material featuring critical dispersion characteristics can be used to stabilize foam reaction in preparing high resilience polyurethane foam.

Another technique for introducing polymer particles into a polyol is taught in U.S. Pat. No. 3,360,495 in which is formed a dispersion of a polyurethane in a polyol. According to this method, the polyol must contain exclusively secondary hydroxyl groups—this is to insure that only small amounts of the polyol become co-reacted into the polyurethane and the particles remain insoluble. Therefore, the resulting dispersion does not contain the requisite primary hydroxyl group content for specific use in high resilience foam production. If appropriate polyol is added to provide a total polyol reactant mixture with sufficient primary hydroxyl group content, the solids content of the mixture becomes reduced to a level which may produce a foam with inadequate load bearing properties.

In U.S. Pat. No. 4,374,209, polymer particles are formed in a polyol by reacting an organic isocyanate with an olamine, an organic compound containing one or more hydroxyl groups and one or more amine groups. While this may provide a dispersion with utility in high resilience foam applications, the amine group is generally catalytic to the isocyanate-water reaction, resulting in a narrow processing lattitude. As such, the system is sensitive to small catalyst quantity variations. Very slight deviations from these limits can cause overly fast reaction with insufficient resilience occurring in the foam product.

Thus, there is a need in the art for an improved polyol system which can be used in preparing high resilience polyurethane foams with desirable physical properties.

Accordingly, it is an object of the invention to provide an improved stable dispersion of a polymer in a polyol particularly suitable for high resilience polyurethane foam applications.

It is another object of the invention to provide a stable dispersion of a polymer in polyol, which dispersion can be used in producing high resilience polyurethane foam exhibiting desirable load bearing characteristics and that achieves improved processing acceptability.

Now, according to the invention, it has been discovered that an improvement can be achieved in the preparation of high resilience foam by including in the foam-forming reaction mixture an improved polyol reactant which is a stable dispersion of a polymer in a polyol. This novel dispersion is prepared by reacting an organic polyisocyanate with a short-chain polyol in a high molecular weight polyol, which contains a relatively high primary hydroxyl group content. In the preparation of the dispersion, the ratio of the content of primary hydroxyl groups in the short-chain polyol to that in the high molecular weight polyol must exceed a critical limit as defined in the relationship below; and the reaction is carried out in the presence of a small proportion of water, and this serves to result in a reduction in the viscosity of the resulting dispersion. A stable dispersion is achieved which can be used in making high resilience polyurethane foam with resilience and strength characteristics desired in a foam of this type and which provides a product which is desirably stabilized against pre-cure shrinkage.

More in detail, in the process of the invention, the high molecular weight polyol contains from about 35 to about 80 percent of primary hydroxyl groups, based on the total number of hydroxyl groups present. It is also a critical part of the invention that the ratio of the content of primary hydroxyl groups in the short-chain polyol to that in the high molecular weight polyol be at least about 3.5, the ratio being defined in the following manner:

$$R = \frac{\Sigma_i (W_{s,i} \times N_{s,i} \times P_{s,i})}{\Sigma_i (W_{H,i} \times N_{H,i} \times P_{H,i})}$$

wherein:
- $W_{s,i}$ is the weight of each short-chain polyol;
- $N_{s,i}$ is the hydroxyl number of each short-chain polyol;
- $p_{s,i}$ is the percent of primary hydroxyl groups in each short-chain polyol;
- $W_{H,i}$ is the weight of each high molecular weight polyol;
- $N_{H,i}$ is the hydroxyl number of each high molecular weight polyol; and
- $P_{H,i}$ is the percent of primary hydroxyl groups in each high molecular weight polyol.

As an additional requirement of the process, the organic polyisocyanate/short-chain polyol reaction is carried out in the presence of a small amount of water. It has been found, according to the invention, that the incorporation of a small amount of water into the reaction mixture achieves a reduction in the viscosity of the resulting dispersion. This additional feature is important in allowing a greater ease in adding the dispersion to the foam-forming reaction mixture when the dispersion is to be used in form formation. However, the amount of water present in the system cannot exceed a small proportion; otherwise, it has been found that the presence of an amount of water which is too great may cause the polymer particles to dissolve in the high molecular weight polyol medium.

The resulting dispersion is of relatively low viscosity and can be used directly in the preparation of high resilience foam or, if desired, is sufficiently stable that it may be stored for a reasonable period of time prior to use. In some cases, it may be desirable to employ the dispersion in combination with an additional polyol having a high primary hydroxyl group content, it being generally necessary that the total polyol reactant have a primary hydroxyl group content of at least about 60 percent. It is a particular feature of the invention, however, that the dispersion has a relatively high primary hydroxyl group content, and it is generally not necessary to use an amount of additional polyol which would lower the solid particles content of the total polyol to below about 2.5 to about 10 percent; and a foam product can be readily obtained featuring desirable strength characteristics.

In preparing the dispersion of the invention, any suitable organic polyisocyanate, or mixture of polyisocyanates, may be used including toluene diisocyanate, such as the 80:20 and the 65:35 mixtures of the 2,4- and 2,6-isomeric forms, ethylene diisocyanate, propylene diisocyanate, methylene-bis(4-phenyl isocyanate), methylene-bis (4-cyclohexyl) isocyanate, xylene diisocyanate, 3,3'-bitoluene-4,4'-diisocyanate, hexamethylene diisocyanate, naphthalene 1,5-diisocyanate, isophorone diisocyanate, the polymeric isocyanates such as polyphenylene polymethylene isocyanate, and the like and mixtures thereof. In accordance with a particularly preferred embodiment of the invention, there is employed an isomeric mixture of 2,4- and 2,6-toluene diisocyanate in which the weight ratio of the 2,4-isomer to the 2,6-isomer is from about 60:40 to about 90:10, and more preferably, from about 65:35 to about 80:20.

As indicated above, the organic polyisocyanate is reacted with a short-chain polyol. These short-chain polyols are free of an amine group and have an average molecular weight of about 400 or less, preferably from about 50 to about 200, and an average functionality of about 2 to about 4. Suitable short-chain polyols include the following and mixtures thereof: (a) low molecular weight diols, such as ethylene glycol, 1,4-butane diol, 1,5-pentane diol, 1,6-hexane diol, diethylene glycol, bisphenol A and the like; (b) polyether diols, such as ethylene oxide diols (e.g. triethylene glycol), propylene oxide-ethylene oxide diols, etc. and the like; (c) triols, such as glycerol, trimethylolpropane and the like; (d) tetrols, such as pentaerythritol and the like; (e) ester diols, triols and tetrols, such as those obtained by esterifying adipic, azelaic, glutaric, and the like aliphatic dicarboxylic acids with aliphatic diols and triols, such as those exemplified in (a), (b) and (c) above; and (f) di-, tri- and tetra-ethoxylated diols, triols and tetrols, such as those exemplified in (a), (c), (d) and (e) above. Diols and triols are the preferred short-chain polyol reactant, with ethylene glycol, diethylene glycol, triethylene glycol, 1,4-butane diol, 1,6-hexane diol, glycerol and trimethylolpropane being particularly preferred.

The high molecular weight polyol is a polyether polyol that is characterized by (1) a molecular weight of at least about 1,500, (2) a polyfunctional alcohol nucleus, (3) polyoxyalkylene chain segments attached through one end thereof to the nucleus, and (4) a primary hydroxyl group content ranging from about 35 to about 80 percent. This polyether polyol can be prepared by methods generally well known in the art wherein a polyfunctional alcohol initiator is condensed, in the presence of an alkaline catalyst, first with an alkylene oxide having 3 or more carbon atoms and then with ethylene oxide.

The alcohol initiator which is used to prepare the polyether polyol can be any compound having about 2 to about 8 hydroxyl groups. Illustrative are ethylene glycol, propylene glycol, the butylene glycols such as 1,3-butylene glycol, the pentane diols such as 1,5-pentane diol, the hexane diols such as 1,6-hexane diol, glycerol, trimethylolpropane, sorbitol, pentaerythritol, methyl glucoside, sucrose, and the like and mixtures thereof. It is preferred, however, to employ an aliphatic polyol having about 2 to about 4, and more preferably about 3 to about 4, hydroxyl groups. The most preferred initiators are the aliphatic triols such as glycerol and trimethylolpropane.

In preparing the polyether polyol, a polyhydric alcohol initiator as described above is sequentially condensed, in the presence of an alkaline catalyst such as potassium hydroxide, first with an alkylene oxide having 3–8, and preferably 3–4, carbon atoms and then ethylene oxide. Illustrative of the alkylene oxides which are first condensed with the alcohol initiator are propylene oxide, butylene oxide, pentylene oxide, mixtures thereof and the like, propylene oxide being most preferred. In carrying out the sequential condensation reactions, such amounts of ethylene oxide and higher alkylene oxide are employed as to provide a polyether polyol having a molecular weight of at least about 1,500, and preferably from about 4,000 to about 7,000, and in which the primary hydroxyl group content is from about 35 to about 80 percent, and preferably from about 50 to about 75 percent.

In accordance with a particularly preferred embodiment of the invention, the polyether polyol which is employed in preparing the polyurethane foam is an oxypropylated, oxyethylated aliphatic triol having a molecular weight of about 4,500–6,600 and a primary hydroxyl group content from about 65 to about 75 percent.

As noted above, the ratio of the content of primary hydroxyl groups in the short-chain polyol to that in the high molecular weight polyol is defined by the relationship set forth above. As a critical feature of the invention, it has been found that this ratio, or R-factor, should be at least about 3.5; preferably the R-factor should be at least about 4. Specifically, this R-factor must be at least the critical lower limit of 3.5 in order to obtain a stable dispersion as sought by the invention. Surprisingly, as long as a short-chain polyol and a high molecular weight polyol are selected as to achieve an R-factor of at least about 3.5, insoluble particles will be formed in the high molecular weight polyol and a stable dispersion will result.

The reaction is also carried out in the presence of a small proportion of water. It has been discovered that the presence of a small proportion of water in the reaction mixture will serve to lower the viscosity of the resulting dispersion. Preferably, the amount of water in the mixture will range from about 0.01 to about 1.0 percent, and most preferably from about 0.1 to about 0.5 percent, by weight based on the total weight of the organic polyisocyanate, the short-chain polyol and the high molecular weight polyol. The amount of water utilized has to be sufficient in order to produce the desired viscosity lowering effect; but, if too high, excessive foaming during the reaction will be caused by an overabundance of carbon dioxide evolution.

To form the stable dispersion that is utilized according to the invention, an excess of short-chain polyol is generally employed, such that the molar ratio of organic polyisocyanate to short-chain polyol usually ranges from about 0.7 to about 1.0, and preferably from about 0.8 to about 0.9. When higher proportions of isocyanate are employed, there is a substantial increase in viscosity and rapid gellation tends to occur. As the quantity of isocyanate is reduced to a level which is too low, little or no particle formation generally results.

Generally, the reaction is further carried out employing such relative proportions as to achieve an organic polyisocyanate/short-chain polyol reaction product which ranges from about 10 to about 30 percent by weight based on the total weight of the organic polyisocyanate, the short-chain polyol and the high molecular weight polyol. Preferably, however, the reaction product or solid particles content of the dispersion varies from about 15 to about 25 percent by weight. If the relative proportions of the components are such as to provide a reaction product content in the dispersion of less than about 10 percent, a clear solution with insufficient particle formation will generally be obtained. On the other hand, the use of relative proportions, which would yield a reaction product content in excess of the upper level of about 30 percent, will likely lead to development of an unacceptably high exotherm during the course of the reaction.

Common urethane catalysts, e.g., tertiary amines and metal compounds such as stannous octoate, dibutyltin dilaurate or dibutyl di(lauryl mercapto) tin may be used to accelerate the reaction. The reaction temperature and time will both depend upon many factors. Generally, however, a reaction temperature from about 15° C. to about 100° C. and a reaction time from about 1 minute to about 1 hour are employed. Preferably, the reaction temperature is within the range from about 30° C. to about 50° C.

In preparing high resilience polyurethane foam pursuant to the present invention, except for the inclusion of the stable dispersion as defined above, any prior art high resilience foam formulation may be employed. The polyurethane foam products are prepared by reacting any suitable combination of an organic polyisocyanate, a stable dispersion of the invention and optionally an additional polyol, the total polyol reactant having a primary hydroxyl group content of at least about 60 percent. The reaction is conducted in the presence of a catalyst for the reaction, a foaming agent and usually a foam stabilizing agent. In the preparation of the polyurethane foams, either the so-called "one-shot method" or the "semi-prepolymer technique" may be employed, the one-shot method being generally preferred.

The organic polyisocyanate reactant used in preparing the polyurethane foams of the invention may be any of those described above as being useful in forming the stable dispersion. In practice, the organic polyisocyanate is usually used in a proportion to provide no more than about 1.25 NCO groups per each hydroxy group. A 100 multiple of the ratio of NCO to OH groups in the reaction system is referred to as the "index".

Under some circumstances, it may be preferred to include an additional polyol in the foam-forming reaction mixture. To facilitate handling, the additional polyol may be added to the stable dispersion prior to its inclusion in the foam formulation. When so employed, the additional polyol may be any of the high molecular weight polyols set forth above as being useful in the preparation of the stable dispersion. It is required, however, that the total polyol reactant included in the foam formulation have a primary hydroxyl group content of at least about 60 percent. The amount of polyol added is generally such that the resulting diluted dispersion will contain a solid particles content ranging from about 2.5 percent to about 10 percent by weight based on the weight of the total polyol.

The catalyst employed in preparing the foams of the invention may be any of the catalysts known to be useful for this purpose, including a tertiary amine, an organo-metallic salt, a mixture of an organo-metallic salt with one or more tertiary amine, etc. Typical tertiary amines include, for example, triethylamine, triethylene diamine, trimethylamine, tetramethylene diamine, tetramethylbutane diamine, N-methylmorpholine, N-ethylmorpholine, dimethylpiperazine, trimethylaminoethylpiperazine, dimethylcyclohexylamine, mixtures of bis(dimethylaminoethylether) and dipropylene glycol such as the 7:3 weight ratio mixture which is available commercially under the trademark "Niax A-1", methyldicyclohexylamine, N-cyclohexylmorpholine, dimethylcyclohexylamine, methyldiethanolamine, mixtures of dimethylcyclohexylamine and 2-(3-pentyl)-1-dimethylaminocyclohexane such as may be purchased commercially under the trademark "Polycat", bis(dimethylaminoethylpropylether), mixtures of triethylene diamine and dipropylene glycol such as the 1:2 and 1:4 weight ratio mixtures which may be purchased commercially under the trademarks "Dabco 33LV" and "Dabco 8020", respectively, bis(dimethylaminopropylether) and mixtures of these catalysts. The preferred tertiary amine catalysts are triethylene diamine, mixtures of triethylene diamine with dipropylene glycol, mixtures of bis(dimethylaminoethylether) and dipropylene glycol, dimethylcyclohexylamine alone or as a mixture thereof with 2-(3-pentyl)-1-dimethylaminocyclohexane. The tertiary amine catalyst is used in a proportion of about 0.1–1.5, and preferably about 0.25–0.75, parts per 100 parts by weight of the total polyol which is employed in preparing the polyurethane foam.

Typical organo-metallic salts include, for example, the salts of tin, mercury, titanium, antimony, aluminum, cobalt, zinc, bismuth, lead, and cadmium, the tin salts, i.e., stannic and stannous salts, being preferred. Illustratively, such salts include the octoates, dilaurates, diacetates, dioctoates, oleates, and neodeconates of these metals, the octoates being preferred. The organo-metallic salt catalyst is used in a proportion of about 0–0.5, and preferably about 0.01–0.2, parts per 100 parts by weight of the total polyol which is employed in the preparation of the foam.

Any suitable foaming agent, or mixture of foaming agents, may be employed. These include inorganic foaming agents, such as water, and organic foaming agents containing up to seven carbon atoms, such as the halogenated hydrocarbons and the low molecular weight alkanes, alkenes and ethers. Illustrative organic foaming agents include monofluorotrichloromethane, dichlorofluoromethane, dichlorodifluoromethane, 1,1,2-trichloro-1,2,2-trifluoroethane, methylene chloride, chloroform, carbon tetrachloride, methane, ethane, ethylene, propylene, hexane, ethyl ether, diisopropyl ether, mixtures thereof and the like. Water and the low molecular weight polyhalogenated alkanes, such as monofluorotrichloromethane, dichlorodifluoromethane and methylene chloride, are preferred. The amount of foaming agent can be varied over a wide range, as is known to those skilled in the art. Generally, however, the halogenated alkanes, for example, are employed in an amount of about 2–20 parts per 100 parts by weight of the total polyol; and water is employed in an amount of about 1–6 parts per 100 parts by weight of the total polyol.

It is preferred in the preparation of the polyurethane foams of the invention to employ minor amounts of a surfactant in order to further improve the cell structure of the polyurethane foam. Suitable such surfactants include, for example, the silicon based surfactants such as the silicones and the siloxane-oxyalkylene block copolymers, all of which are commercially available materials. Generally, the silicones are employed in a proportion of up to about 0.1 parts per 100 parts by weight of the total polyol; and the siloxane-oxyalkylene block copolymers are employed in a proportion of up to about 2 parts per 100 parts by weight of the total polyol.

Various additives can also be employed to provide different properties in the polyurethane foam, e.g., fillers such as clay, calcium sulfate or ammonium phosphate may be added to lower cost and improve physical properties. Ingredients such as dyes may be added for color, and fibrous glass, asbestos or synthetic fibers may be added for strength. In addition, plasticizers, deodorants, antioxidants and flame retardants may be added.

Foams prepared in accordance with the principles of the present invention are characterized by favorable processing characteristics and physical properties. The foams are substantially open-celled and become tack-free within a relatively short period of time after foaming cessation. Generally ranging in density from about 1.0 to about 5.0, preferably from about 1.7 to about 3.0, pounds per cubic foot, the cured foams feature a Sag factor in excess of 2.2, generally ranging from about 2.3 to about 3.2, and a ball rebound generally greater than about 50 percent. These high resilience foams are flexible and soft and exhibit little or no tendency to bottom out. The foams of the invention are also characterized by good tear strength, tensile strength and elongation properties. By virtue of the combination of desirable physical properties characterizing the polyurethane foams of the invention, these foams are of utility in numerous cushioning applications.

The following examples are provided to further illustrate the invention.

EXAMPLE 1

A mixture of 280 grams of a first polyether triol[1] and 120 grams of a second polyether triol[2] was made. After vacuum stripping, this polyol mixture had a water content of 0.04 percent. A total of 39.9 grams diethylene glycol[3] was dissolved in this mixture. The R-factor was $$\frac{39.9 \times 1,058}{280 \times 35.9 \times 0.72} = 5.8/1.0.$$

[1]This is a triol having a molecular weight of about 4,690 and prepared by oxypropylating glycerin, then oxyethylating to a final hydroxyl number of about 35.9, with 72 percent of the hydroxyl groups being primary.
[2]This is a triol having a molecular weight of about 3,000 and prepared by oxypropylating glycerin to a final hydroxyl number of about 56.6.
[3]This is a diol having a hydroxyl number of 1,058.

The mixture was heated to 40° C. in an open 1-liter stainless steel beaker, while stirring slowly with a 3" diameter propeller-type stirrer-blade. When 40° C. was reached, the stirrer was speeded up to 1,000 rpm and 60.1 grams of diisocyanate[4] was added all at once.

[4]This is a mixture of toluene diisocyanate isomers (80:20 mixture of 2,4/2,6-isomers).

One minute later (42° C.), 0.20 grams of a catalyst[5] was added and the stirrer was stopped 30 seconds later. At 47 seconds, after the catalyst addition, the mixture turned white, while the exotherm raised the temperature to 86° C. after 7 minutes. After cooling to 25° C., a viscosity of 60,500 cps was measured. It was determined[6] that all particles were smaller than 1 micrometer. A dispersion with a calculated solid particles content of 20 percent was obtained.

[5]This is dibutyl di(lauryl mercapto) tin and is a commercial product of Witco Chemical Corporation, purchased under the designation "Fomrez UL-1".
[6]The particle size was measured by using a "Fineness-of-Grind Gauge", as described in ASTM D1210-64 (1970).

EXAMPLE 2

A dispersion was made following the procedure of Example 1, except that the polyether triol mixture was not dried, and its water content was 0.08 percent. Water was then added to provide a total water content of 0.18 percent prior to addition of the diethylene glycol. The mixture turned white after 80 seconds. The viscosity of the dispersion was measured to be 45,500 cps. The dispersion was then diluted with an equal amount of the first polyether triol[1] and the resulting dispersion had a calculated solid particles content of 10 percent and a viscosity of 4,850 cps. It had a hydroxyl number of 41.3, with 54 percent of the hydroxyl groups being primary. Upon further dilution to a solid particles content of 5 percent, the viscosity of the resulting dispersion was lowered to below 2,000 cps, with a hydroxyl number of 38.6 and with 62.3 percent of the hydroxyl groups being primary.

[1]This is a triol having a molecular weight of about 4,690 and prepared by oxypropylating glycerin, then oxyethylating to a final hydroxyl number of about 35.9, with 72 percent of the hydroxyl groups being primary.

EXAMPLE 3

A dispersion was prepared according to the procedure of Example 2, except that water was added to provide a total water content of 0.58 percent. The mixture turned white after 100 seconds. The dispersion, with a calculated solid particles content of 20 percent, had a viscosity of 13,600 cps at 25° C.

EXAMPLE 4

A dispersion was prepared according to the procedure of Example 2, except that the reaction was performed at a temperature of 80° C. The mixture turned white after 15 seconds and the exotherm reached a temperature of 122° C. The dispersion, with a calculated solid particles content of 20 percent, had a viscosity of 28,000 cps at 25° C. It had a hydroxyl number of 41.3, with 54.0 percent of the hydroxyl groups being primary.

EXAMPLE 5

A total of 400 grams of a polyether triol[1] was mixed with 39.9 grams of diethylene glycol[2], and 0.5 grams of water was added to provide a total water content of 0.18 percent. The mixture was heated to 80° C. and 60.1 grams of diisocyanate[3] was added with vigorous stirring. After 1 minute, 0.2 grams of a catalyst[4] was added, and the mixture turned white after 15 seconds and the stirrer was stopped after 2 minutes. The temperature rose to 122° C. After cooling, the viscosity of the dispersion, with a calculated solid particles content of 20 percent, was measured to be 93,000 cps at 25° C. It had a hydroxyl number of 36.5, with 76 percent of the hydroxyl groups being primary. When diluted to a solid particles content of 10 percent, the resulting dispersion had a viscosity of 7,200 cps.

[1]This is a triol having a molecular weight of about 4,690 and prepared by oxypropylating glycerin, then oxyethylating to a final hydroxyl number of about 35.9, with 72 percent of the hydroxyl groups being primary.
[2]This is a diol having a hydroxyl number of 1,058.
[3]This is a mixture of toluene diisocyanate isomers (80:20 mixture of 2,4/2,6-isomers).
[4]This is dibutyl di(lauryl mercapto) tin and is a commercial product of Witco Chemical Corporation, purchased under the designation "Fomrez UL-1".

EXAMPLE 6

A dispersion was prepared according to the procedure of Example 1, except that 200 grams of the first polyether triol[1] and 200 grams of the second polyether triol[2] were used. The polyol mixture had a water content of 0.08 percent. The dispersion, with a calculated solid particles content of 20 percent, had a viscosity of 37,500 cps at 25° C.

[1]This is a triol having a molecular weight of about 4,690 and prepared by oxypropylating glycerin, then oxyethylating to a final hydroxyl number of about 35.9, with 72 percent of the hydroxyl groups being primary.
[2]This is a triol having a molecular weight of about 3,000 and prepared by oxypropylating glycerin to a final hydroxyl number of about 56.6.

EXAMPLE 7

A dispersion was prepared according to the procedure of Example 2, except that the polyether triol mixture contained 200 grams of the first polyether triol[1] and 200 grams of the second polyether triol[2], and 36.5 grams of 1,4-butane diol and 63.5 grams of diisocyanate[3] were used. The water content of the mixture was 0.18 percent and the reaction was performed at 40° C. The exotherm reached 90° C. and the polyol mixture turned white after 75 seconds. The dispersion, with a calculated solid particles content of 20 percent, had a viscosity of 71,000 cps at 25° C.

[1]This is a triol having a molecular weight of about 4,690 and prepared by oxypropylating glycerin, then oxyethylating to a final hydroxyl number of about 35.9, with 72 percent of the hydroxyl groups being primary.
[2]This is a triol having a molecular weight of about 3,000 and prepared by oxypropylating glycerin to a final hydroxyl number of about 56.6.
[3]This is a mixture of toluene diisocyanate isomers (80:20 mixture of 2,4/2,6-isomers).

EXAMPLE 8

A dispersion was prepared according to the procedure of Example 7, except that 42.7 grams of 1,6-hexane diol and 57.3 grams of diisocyanate[1] were used. The mixture contained 0.18 percent water and the reaction was carried out at 50° C. The polyol mixture turned white after 75 seconds and had an exotherm to 95° C. The dispersion, with a calculated solid particles content of 20 percent, had a viscosity of 23,000 cps at 25° C.

[1]This is a mixture of toluene diisocyanate isomers (80:20 mixture of 2,4/2,6-isomers).

EXAMPLE 9

A dispersion was prepared according to the procedure of Example 7, except that 48.9 grams of triethylene glycol and 51.1 grams of diisocyanate[1] were reacted in 280 grams of the first polyether triol[2] and 120 grams of the second polyether triol[3]. The water content of the polyol mixture was 0.18 percent. The reaction was carried out at 40° C. and the polyol mixture turned white after 160 seconds. The dispersion, with a solid particles content of 20 percent, had a viscosity of 43.500 cps at 25° C.

[1]This is a mixture of toluene diisocyanate isomers (80:20 mixture of 2,4/2,6-isomers).
[2]This is a triol having a molecular weight of about 4,690 and prepared by oxypropylating glycerin, then oxyethylating to a final hydroxyl number of about 35.9, with 72 percent of the hydroxyl groups being primary.
[3]this is a triol having a molecular weight of about 3,000 and prepared by oxypropylating glycerin to a final hydroxyl number of about 56.6.

COMPARATIVE EXAMPLE A

A polyol was prepared according to the procedure of Example 7, except that different proportions of the various ingredients were used. The polyether triol mixture contained 315 grams of the first polyether triol[1] and 135 grams of the second polyether triol[2], and 18.2 grams of 1,4-butane diol and 31.7 grams of diisocyanate[3] were used. The R-factor was calculated to be only 2.8. A dispersion with a calculated solid particles content of only 10 percent was produced. The water content of the polyol mixture was 0.18 percent, the reaction was performed at 80° C. and the polyol mixture turned white after 90 seconds, but upon cooling, it became nearly clear.

[1]This is a triol having a molecular weight of about 4,690 and prepared by oxypropylating glycerin, then oxyethylating to a final hydroxyl number of about 35.9, with 72 percent of the hydroxyl groups being primary.
[2]This is a triol having a molecular weight of about 3,000 and prepared by oxypropylating glycerin to a final hydroxyl number of about 56.6.

[3] This is a mixture of toluene diisocyanate isomers (80:20 mixture of 2,4/2,6-isomers).

Table I outlines the compositions and properties of the polyol dispersions prepared according to Examples 1–9 and the polyol product resulting from carrying out Comparative Example A.

The foam shrank quite considerably and would be considered not acceptable. See Table III for the results.

TABLE 1

Composition and Properties of Polyol Dispersions

| Example or Comparative Example | Polyether Triol[1] (grams) | Polyether Triol[2] (grams) | Short-Chain Polyol | Short-Chain Polyol (grams) | Diisocyanate[3] (grams) | R-Factor | Temperature (°C.) | Water (Percent) | Time (Sec. to White (Color)) | Viscosity (cps, 20% Solids) |
|---|---|---|---|---|---|---|---|---|---|---|
| 1 | 280 | 120 | Diethylene Glycol | 39.9 | 60.1 | 5.8 | 40 | 0.04 | 45 | 60,500 |
| 2 | 280 | 120 | Diethylene Glycol | 39.9 | 60.1 | 5.8 | 40 | 0.18 | 80 | 45,500 |
| 3 | 280 | 120 | Diethylene Glycol | 39.9 | 60.1 | 5.8 | 40 | 0.58 | 100 | 13,600 |
| 4 | 280 | 120 | Diethylene Glycol | 39.9 | 60.1 | 5.8 | 80 | 0.18 | 15 | 28,000 |
| 5 | 400 | — | Diethylene Glycol | 39.9 | 60.1 | 4.1 | 80 | 0.18 | 15 | 93,000 |
| 6 | 200 | 200 | Diethylene Glycol | 39.9 | 60.1 | 8.2 | 40 | 0.08 | 60 | 37,500 |
| 7 | 200 | 200 | 1,4-Butane Diol | 36.5 | 63.5 | 8.8 | 40 | 0.18 | 75 | 71,000 |
| 8 | 200 | 200 | 1,6-Hexane Diol | 42.7 | 57.3 | 7.8 | 50 | 0.18 | 75 | 23,000 |
| 9 | 280 | 120 | Triethylene Glycol | 48.9 | 51.1 | 5.1 | 40 | 0.18 | 160 | 43,500 |
| CE-A | 315 | 135 | 1,4-Butane Diol | 18.2 | 31.7 | 2.8 | 80 | 0.18 | 90 | 6,700[4] |

[1] This is a triol having a molecular weight of about 4,690 and prepared by oxypropylating glycerin, then oxyethylating to a final hydroxyl number of about 35.9, with 72 percent of the hydroxyl groups being primary.
[2] This is a triol having a molecular weight of about 3,000 and prepared by oxypropylating glycerin to a final hydroxyl number of about 56.6.
[3] This is a mixture of toluene diisocyanate isomers (80:20 mixture of 2,4/2,6-isomers).
[4] This polyol product had a calculated solid particles content of 10 percent.

EXAMPLES 10–12 AND COMPARATIVE EXAMPLE B

Free-rise high resilient foams were prepared from the mixtures set forth in Table II (Examples 10–12) and Table III (Comparative Example B). In each example, the mixture of foam ingredients was poured in an aluminum mold (15.5"×15.5"×4.5") and provided with a cover containing 4 ventholes, each having a diameter of 1/16"), which had been pre-heated to 60°–70° C. After the mixture was poured in the mold, the cover was quickly clamped on, and the mold was then placed in an oven at 125° C. for 6 minutes. The foam was then removed to observe its structure and for weighing. Thereafter, the foam was post-cured at 125° C. for 1 hour before physical properties were measured.

In Examples 10–12, the polyol dispersion of Example 4 was employed. As shown in Table II, additional triol was used in Examples 10 and 11, and the total polyol reactant mixture had a hydroxyl number of 34.8 and a total solid particles content of 2.5 percent and contained 69.2 percent of primary hydroxyl groups. In Example 12, two additional triols were employed, so that the total polyol reactant mixture had a hydroxyl number of 35.9 and a total solid particles content of 2.5 percent and contained 63.7 percent of primary hydroxyl groups. Nonshrinking foams were obtained, the results of the physical property testing being tabulated in Table II.

In Comparative Example B, the polyol product of Comparative Example A was utilized. With reference to Table III, additional triol was used, and the total polyol reactant mixture had a hydroxyl number of 37.5 and a total solid particles content of 2.5 percent and contained 65.6 percent of primary hydroxyl groups.

TABLE II

| | EXAMPLE | | |
|---|---|---|---|
| | 10 | 11 | 12 |
| Polyether Triol[1] | 87.50 | 87.50 | 82.50 |
| Polyol Dispersion (Ex. 4) | 12.50 | 12.50 | 12.50 |
| Polyether Triol[2] | — | — | 5.00 |
| Diethanolamine | 0.75 | 1.00 | 1.00 |
| Triethylene Diamine[3] | 0.50 | 0.50 | 0.50 |
| Tertiary Amine Catalyst[4] | 0.20 | 0.20 | 0.20 |
| Surfactant[5] | 1.50 | 1.50 | 1.50 |
| Water | 4.40 | 4.40 | 3.20 |
| Toluene Diisocyanate[6] | 51.69 | 52.32 | 40.65 |
| NCO/OH (Index) | 1.02 | 1.02 | 1.02 |
| Pad Weight (gms.) | 466 | 470 | 602 |
| Overall, Density, pcf | 1.93 | 1.94 | 2.42 |
| Core, Density, pcf | 1.73 | 1.73 | 2.12 |
| Indentation Load Deflection | | | |
| @ 25% | 23 | 20 | 25 |
| @ 50% | 44 | 39 | 47 |
| @ 65% | 70 | 63 | 75 |
| Sag Factor | 3.02 | 3.14 | 3.03 |
| Tensile, psi | 14.2 | 17.2 | 17.2 |
| Tear, pli | 1.54 | 1.64 | 1.87 |
| Elongation, % | 92 | 110 | 137 |
| Air Flow, cfm | 1.95 | 2.47 | 1.38 |
| Ball Rebound, % | 55 | 51 | 52 |

[1] This is a triol having a molecular weight of about 4,690 and prepared by oxypropylating glycerin, then oxyethylating to a final hydroxyl number of about 35.9, with 72 percent of the hydroxyl groups being primary.
[2] This is a triol having a molecular weight of about 3,000 and prepared by oxypropylating glycerin to a final hydroxyl number of about 56.6.
[3] This is commercially available under the trademark "DABCO 33LV", consisting primarily of triethylene diamine (⅓) and dipropylene glycol (⅔).
[4] This is commercially available under the trademark "NIAX A-1" from Union Carbide Corporation.
[5] This is commercially available siloxane-oxyalkylene block copolymer available under the trademark "DC-556" from Dow Corning.
[6] This is a mixture of toluene diisocyanate isomers (80:20 mixture of 2,4/2,6-isomer).

TABLE III

| Polyether Triol[1] | 75.00 |
|---|---|
| Polyol (Comp. Ex. A) | 25.00 |
| Diethanolamine | 1.00 |
| Triethylene Diamine[2] | 0.50 |
| Tertiary Amine Catalyst[3] | 0.20 |

TABLE III-continued

| | |
|---|---|
| Surfactant[4] | 1.50 |
| Water | 4.40 |
| Toluene Diisocyanate[5] | 52.46 |
| NCO/OH, Index | 1.02 |
| Mold Temp. (°F.) | 138/151 |
| Pad Weight (gms.) | 474 |
| Shrinkage[6] | 5.0+ (shrivelled) |
| Comments | Poor green strength |
| | Poor surface |

[1]This is a triol having a molecular weight of about 4,690 and prepared by oxypropylating glycerin, then oxyethylating to a final hydroxyl number of about 35.9, with 72 percent of the hydroxyl groups being primary.
[2]This is commercially available under the trademark "DABCO 33LV", consisting primarily of triethylene diamine (⅓) and dipropylene glycol (⅔).
[3]This is commercially available under the trademark "NIAX A-1" from Union Carbide Corporation.
[4]This is a commercially available siloxane-oxyalkylene block copolymer available under the trademark "DC-556" from Dow Corning.
[5]This is a mixture of toluene diisocyanate isomers (80:20 mixture of 2,4/2,6-isomers).
[6]This is a relative comparison rated subjectively from 1–5, 1 being excellent, while 5 represents a totally deformed structure.

What is claimed is:

1. A process for preparing a stable dispersion of a polymer in a polyol comprising reacting an organic polyisocyanate with a short-chain polyol in a high molecular weight polyol, wherein:
    (a) said short-chain polyol is free of an amine group and has an average molecular weight of about 400 or less and an average functionality of about 2 to about 4 and is selected from the group consisting of low molecular weight diols, polyether diols, triols, tetrols, ester diols, ester triols, ester tetrols, diethoxylated diols, diethoxylated triols, diethoxylated tetrols, triethoxylated diols, triethoxylated triols, triethoxylated tetrols, tetraethoxylated diols, tetraethoxylated triols and tetraethoxylated tetrols;
    (b) said high molecular weight polyol is a polyoxyalkylene polyether polyol having an average molecular weight of at least about 1,500, an average functionality of about 2 to about 8 and from about 35 to about 80 percent of primary hydroxyl groups, based on the total number of hydroxyl groups present therein;
    (c) the molar ratio of said organic polyisocyanate to said short-chain polyol ranges from about 0.7 to about 1.0;
    (d) the organic polyisocyanate/short-chain polyol reaction product constitutes from about 10 to about 30 percent by weight based on the total weight of said organic polyisocyanate, said short-chain polyol and said high molecular weight polyol;
    (e) the ratio of the content of primary hydroxyl groups in said short-chain polyol to that in said high molecular weight polyol is defined by the following relationship $$R = \frac{\Sigma_i (W_{s,i} \times N_{s,i} \times P_{s,i})}{\Sigma_i (W_{H,i} \times N_{H,i} \times P_{H,i})}$$

wherein
    $W_{s,i}$ is the weight of each short-chain polyol,
    $N_{s,i}$ is the hydroxyl number of each short-chain polyol,
    $P_{s,i}$ is the percent of primary hydroxyl groups in each short-chain polyol,
    $W_{H,i}$ is the weight of each high molecular weight polyol,
    $N_{H,i}$ is the hydroxyl number of each high molecular weight polyol, and
    $P_{H,i}$ is the percent of primary hydroxyl groups in each high molecular weight polyol,
    said ratio being at least about 3.5; and
    (f) said reaction is carried out in the presence of a small proportion of water to reduce the viscosity of said dispersion, said proportion ranging from about 0.1 to about 0.5 percent by weight based on the total weight of said organic polyisocyanate, said short-chain polyol and said high molecular weight polyol.

2. The process of claim 1, wherein said short-chain polyol has an average functionality of about 2 to about 3.

3. The process of claim 1, wherein said high molecular weight polyol has an average molecular weight of about 4,000 to about 7,000 and an average functionality of about 2 to about 4.

4. The process of claim 1, wherein said ratio is at least about 4.

5. The process of claim 1, wherein the molar ratio of organic polyisocyanate to short-chain polyol ranges from about 0.8 to about 0.9 and wherein the organic polyisocyanate/short-chain polyol reaction product constitutes from about 15 to about 25 percent by weight based on the total weight of said organic polyisocyanate, said short-chain polyol and said high molecular weight polyol.

6. The process of claim 5, wherein said short-chain polyol is a diol selected from the group consisting of ethylene glycol, diethylene glycol, triethylene glycol, 1,4-butane diol, 1,6-hexane diol, glycerol and trimethylolpropane.

7. The process of claim 6, wherein said high molecular weight polyol is an oxypropylated, oxyethylated aliphatic triol having a molecular weight of about 4,500 to about 6,600 and from about 65 to about 75 percent of primary hydroxyl groups.

8. The process of claim 7, wherein said organic polyisocyanate is toluene diisocyanate.

9. A dispersion prepared according to the process of claim 1.

10. A dispersion prepared according to the process of claim 2.

11. A dispersion prepared according to the process of claim 4.

12. A dispersion prepared according to the process of claim 6.

13. A dispersion prepared according to the process of claim 8.

14. A process for preparing a high resilience polyurethane foam comprising reacting an organic polyisocyanate with a polyol reactant in the presence of a foaming agent and a reaction catalyst, said polyol reactant comprising a stable dispersion of a polymer in a polyol and optionally an additional polyol and containing at least about 60 percent of primary hydroxyl groups, said foam exhibiting a Sag factor in excess of about 2.2, said dispersion being prepared by reacting an organic polyisocyanate with a short-chain polyol in a high molecular weight polyol, wherein:
    (a) said short-chain polyol is free of an amine group and has an average molecular weight of about 400 or less and an average functionality of about 2 to about 4 and is selected from the group consisting of low molecular weight diols, polyether diols, triols, tetrols, ester diols, ester triols, ester tetrols, diethoxylated diols, diethoxylated triols, diethoxylated tetrols, triethoxylated diols, triethoxylated triols, triethoxylated tetrols, tetraethoxylated diols, tetraethoxylated triols and tetraethoxylated tetrols;

(b) said high molecular weight polyol is a polyoxyalkylene polyether polyol having an average molecular weight of at least about 1,500, an average functionality of about 2 to about 8 and from about 35 to about 80 percent of primary hydroxyl groups, based on the total number of hydroxyl groups present therein;

(c) the molar ratio of said organic polyisocyanate to said short-chain polyol ranges from about 0.7 to about 1.0;

(d) the organic polyisocyanate/short-chain polyol reaction product constitutes from about 10 to about 30 percent by weight based on the total weight of said organic polyisocyanate, said short-chain polyol and said high molecular weight polyol;

(e) the ratio of the content of primary hydroxyl groups in said short-chain polyol to that in said high molecular weight polyol is defined by the following relationship $$R = \frac{\Sigma_i (W_{s,i} \times N_{s,i} \times P_{s,i})}{\Sigma_i (W_{H,i} \times N_{H,i} \times P_{H,i})}$$

wherein $W_{s,i}$ is the weight of each short-chain polyol, $N_{s,i}$ is the hydroxyl number of each short-chain polyol, $P_{s,i}$ is the percent of primary hydroxyl groups in each short-chain polyol, $W_{H,i}$ is the weight of each high molecular weight polyol, $N_{H,i}$ is the hydroxyl number of each high molecular weight polyol, and $P_{H,i}$ is the percent of primary hydroxyl groups in each high molecular weight polyol, said ratio being at least about 3.5; and (f) said reaction is carried out in the presence of a small proportion of water to reduce the viscosity of said dispersion, said proportion ranging from about 0.1 to about 0.5 percent by weight based on the total weight of said organic polyisocyanate, said short-chain polyol and said high molecular weight polyol.

15. The process of claim 14, wherein said short-chain polyol has an average functionality of about 2 to about 3.

16. The process of claim 14, wherein said high molecular weight polyol has an average molecular weight of about 4,000 to about 7,000 and an average functionality of about 2 to about 4.

17. The process of claim 14, wherein said ratio is at least about 4.

18. The process of claim 14, wherein the molar ratio of organic polyisocyanate to short-chain polyol ranges from about 0.8 to about 0.9 and wherein the organic polyisocyanate/short-chain polyol reaction product constitutes from about 15 to about 25 percent by weight based on the total weight of said organic polyisocyanate, said short-chain polyol and said high molecular weight polyol.

19. The process of claim 18, wherein said short-chain polyol is a diol selected from the group consisting of ethylene glycol, diethylene glycol, triethylene glycol, 1,4-butane diol, 1,6-hexane diol, glycerol and trimethylolpropane.

20. The process of claim 19, wherein said high molecular weight polyol is an oxypropylated, oxyethylated aliphatic triol having a molecular weight of about 4,500 to about 6,600 and from about 65 to about 75 percent of primary hydroxyl groups.

21. The process of claim 20, wherein said organic polyisocyanate is toluene diisocyanate.

22. A polyurethane foam prepared according to the process of claim 14.

23. A polyurethane foam prepared according to the process of claim 15.

24. A polyurethane foam prepared according to the process of claim 17.

25. A polyurethane foam prepared according to the process of claim 19.

26. A polyurethane foam prepared according to the process of claim 21.

* * * * *